United States Patent
Lee (10) Patent No.: US 10,922,016 B2
(45) Date of Patent: Feb. 16, 2021

(54) DATA PROCESSING SYSTEM AND OPERATING METHOD THEREOF

(71) Applicant: SK hynix Inc., Icheon-si (KR)

(72) Inventor: Hui-Won Lee, Seoul (KR)

(73) Assignee: SK hynix Inc., Icheon-si (KR)

( * ) Notice: Subject to any disclaimer, the term of this patent is extended or adjusted under 35 U.S.C. 154(b) by 142 days.

(21) Appl. No.: 16/026,667

(22) Filed: Jul. 3, 2018

(65) Prior Publication Data

US 2019/0138246 A1 May 9, 2019

(30) Foreign Application Priority Data

Nov. 7, 2017 (KR) .................. 10-2017-0147314

(51) Int. Cl.
| | |
|---|---|
| G06F 12/00 | (2006.01) |
| G06F 3/06 | (2006.01) |
| G06F 12/08 | (2016.01) |
| G06F 13/16 | (2006.01) |

(52) U.S. Cl.
CPC .......... *G06F 3/0659* (2013.01); *G06F 3/0611* (2013.01); *G06F 3/0634* (2013.01); *G06F 3/0679* (2013.01); *G06F 12/08* (2013.01); *G06F 13/16* (2013.01)

(58) Field of Classification Search
None
See application file for complete search history.

(56) References Cited

U.S. PATENT DOCUMENTS

| | | | |
|---|---|---|---|
| 9,137,335 B2 | 9/2015 | Hershko et al. | |
| 9,348,537 B2 | 5/2016 | Raviv et al. | |
| 2010/0082857 A1* | 4/2010 | Klein | G06F 13/1684 710/51 |
| 2012/0327728 A1* | 12/2012 | Anderson | G11C 7/00 365/191 |
| 2015/0331474 A1 | 11/2015 | Seo et al. | |
| 2016/0034203 A1 | 2/2016 | Jang et al. | |
| 2016/0043755 A1 | 2/2016 | Kim et al. | |

FOREIGN PATENT DOCUMENTS

| | | |
|---|---|---|
| KR | 1020150133085 A | 11/2015 |
| KR | 1020160016485 A | 2/2016 |
| KR | 1020160018302 A | 2/2016 |
| KR | 1020160019836 A | 2/2016 |
| KR | 1020160029148 A | 3/2016 |
| KR | 1020160054494 A | 5/2016 |

* cited by examiner

*Primary Examiner* — Daniel D Tsui
(74) *Attorney, Agent, or Firm* — William Park & Associates Ltd.

(57) ABSTRACT

A data processing system may include a plurality of memory systems and a host configured to provide commands for the memory systems. A first memory system among the memory systems may receive the commands from the host, check each of the memory systems where a plurality of command operations corresponding to the commands are to be performed, transmit respective commands among the commands to respective remaining memory systems except for the first memory system among the memory systems through a plurality of dedicated channels, and perform a first command operation corresponding to the first memory system in at least one of the remaining memory systems.

19 Claims, 8 Drawing Sheets

— DATA PROCESSING SYSTEM AND OPERATING METHOD THEREOF

CROSS-REFERENCE TO RELATED APPLICATIONS

The present application claims priority under 35 U.S.C. § 119(a) to Korean Patent Application No. 10-2017-0147314, filed on Nov. 7, 2017, the disclosure of which is incorporated herein by reference in its entirety.

BACKGROUND

1. Technical Field

Various embodiments generally relate to an electronic device. Particularly, examples of embodiments may relate to a data processing system, and an operating method thereof.

2. Related Art

The computer environment paradigm has changed to ubiquitous computing systems that can be used anytime and anywhere. That is, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

SUMMARY

In accordance with an embodiment, a data processing system may include a plurality of memory systems and a host configured to provide commands for the memory systems. A first memory system among the memory systems may receive the commands from the host, check each of the memory systems where a plurality of command operations corresponding to the commands are to be performed, transmit respective commands among the commands to respective remaining memory systems except for the first memory system among the memory systems through a plurality of dedicated channels, and perform a first command operation corresponding to the first memory system in at least one of the remaining memory systems.

A memory system may store data corresponding to the command operation in a static random access memory (SRAM) included in a memory of a controller of the memory system.

The data processing system may further include a first controller of the first memory system configured to receive the commands from the host, check each of the memory systems where the plurality of command operations corresponding to the commands are to be performed, transmit the respective commands to the respective remaining memory systems except for the first memory system through the plurality of dedicated channels, and perform the first command operation corresponding to the first memory system in the at least one of the remaining memory systems.

In accordance with an embodiment, an operating method of a data processing system may include receiving a plurality of commands for a plurality of memory systems from a host. The method may include checking each of the memory systems where a plurality of command operations corresponding to the commands are to be performed. The method may include transmitting respective commands among the commands to each of the respective memory systems through a plurality of dedicated channels. The method may include performing the corresponding command operations in each of the memory systems. The performing of the corresponding command operations may include performing a first command operation corresponding to a first memory system among the memory systems in at least one of remaining memory systems except for the first memory system.

In accordance with an embodiment, a data processing system may include a host. The data processing system may include a first memory system including a first host interface and a first system interface. The data processing system may include a second memory system including a second host interface and a second system interface. The data processing system may include a dedicated channel coupling the first system interface and the second system interface. Any one of the first memory system and the second memory system may perform an operation of the host based on a command of the host.

When the first memory system may perform the operation of the host, a first processor included in the first memory system drives the first system interface, and provides an output of the first system interface to the second system interface corresponding to the driving of the first system interface.

DETAILED DESCRIPTION

Various embodiments are described below with reference to the accompanying drawings. We note, however, that the examples may be embodied in different other embodiments, forms and variations thereof and should not be construed as being limited to the embodiments set forth herein. Rather, the described embodiments are provided so that this disclosure will be thorough and complete, and will fully convey the concepts to those skilled in the art. Throughout the disclosure, like reference numerals refer to like parts throughout the various figures and embodiments.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present disclosure.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present disclosure. The concepts may be practiced without some or all of these specific details. In other instances, well-known process structures and/or processes have not been described in detail in order not to unnecessarily obscure the present disclosure.

It is also noted, that in some instances, as would be apparent to those skilled in the relevant art, a feature or element described in connection with one embodiment may be used singly or in combination with other features or elements of another embodiment, unless otherwise specifically indicated.

Embodiments may be directed to a data processing system capable of processing data quickly and stably in a plurality of memory systems and maximizing the use efficiency of the memory systems, and an operating method of the data processing system.

Figure 1:
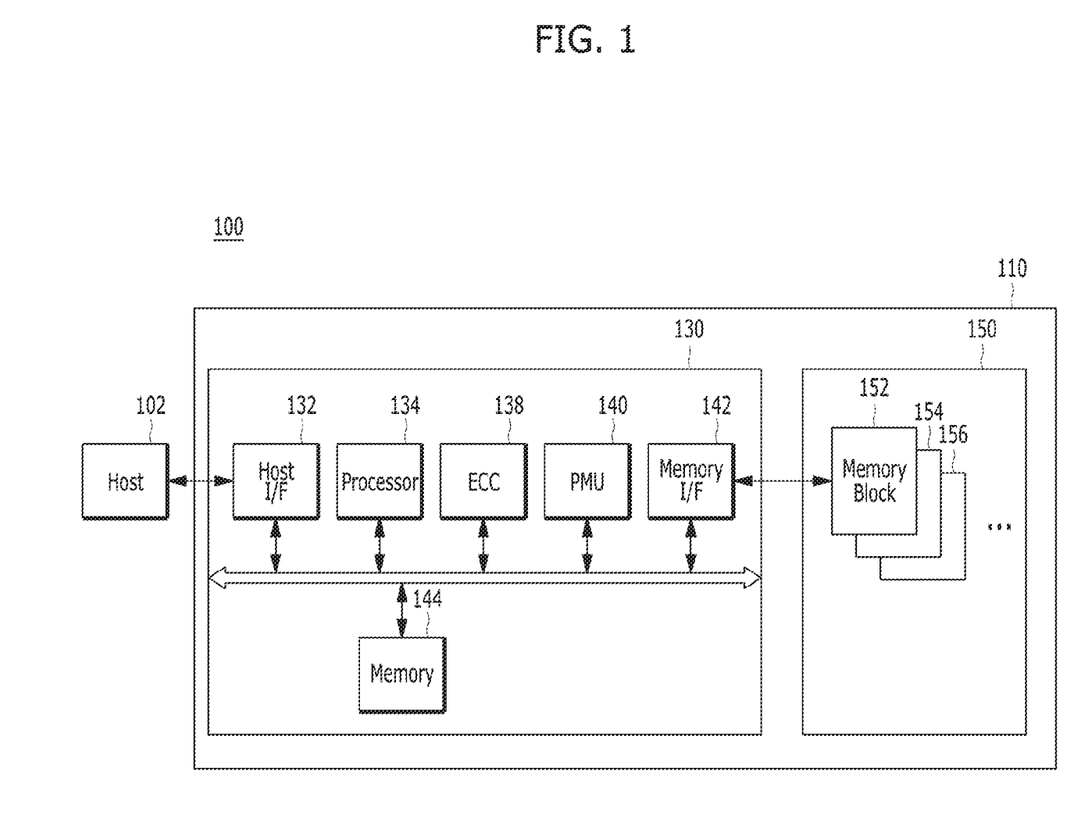
FIG. 1 is a block diagram illustrating a data processing system including a memory system, in accordance with an embodiment.

FIG. 1 is a block diagram illustrating a data processing system 100 in accordance with an embodiment.

Referring to FIG. 1, the data processing system 100 may include a host 102 operatively coupled to a memory system 110.

The host 102 may include, for example, a portable electronic device such as a mobile phone, an MP3 player, and a laptop computer or an electronic device such as a desktop computer, a game player, a TV, a projector, and the like.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM) and nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in the various types of memory systems as exemplified above.

The memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages. Each of the pages may include a plurality of memory cells to which a plurality of word lines WL are electrically coupled.

The controller 130 may control overall operations of the memory device 150, such as read, write, program, and erase operations. For example, the controller 130 of the memory system 110 may control the memory device 150 in response to a request from the host 102. The controller 130 may provide the data read from the memory device 150, to the host 102, and/or may store the data provided from the host 102 into the memory device 150.

The controller 130 may include a host interface (I/F) unit 132, a processor 134, an error correction code (ECC) unit 138, a power management unit (PMU) 140, a memory interface I/F unit 142 such as a NAND flash controller (NFC), and a memory 144 all operatively coupled via an internal bus.

The host interface unit 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE), etc.

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, modules, systems, or devices for the error correction operation.

The PMU 140 may provide and manage power of the controller 130.

The memory interface unit 142 may serve as a memory/storage interface between the controller 130 and the memory device 150 to allow the controller 130 to control the memory device 150 in response to a request from the host 102. The memory interface unit 142 may generate a control signal for the memory device 150 and process data to be provided to the memory device 150 under the control of the processor 134 when the memory device 150 is a flash memory and, in particular, when the memory device 150 is a NAND flash memory. It is noted that the present disclosure is not limited to NAND flash memory/NAND flash interface, and that a suitable memory/storage interface may be selected depending upon the type of the memory device 150.

The memory 144 may serve as a working memory of the memory system 110 and the controller 130, and store data for driving the memory system 110 and the controller 130. The controller 130 may control the memory device 150 in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be implemented with a volatile memory. The memory 144 may be implemented with a static random access memory (SRAM) or a dynamic random access memory (DRAM). Although FIG. 1 illustrates the memory 144 inside controller 130, it is for illustrative purposes only, and the present disclosure is not limited thereto. That is, the memory 144 may be disposed within or out of the controller 130. In another embodiment, the memory 144 may be embodied by an external volatile memory having a memory interface transferring data between the memory 144 and the controller 130.

The processor 134 may control the overall operations of the memory system 110. The processor 134 may drive firmware, which is referred to as a flash translation layer (FTL), to control the general operations of the memory system 110.

The FTL may perform an operation as an interface between the host 102 and the memory device 150. The host 102 may request write and read operations for the memory device 150 through the FTL.

The FTL may manage operations of address mapping, garbage collection, wear-leveling, and so forth. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data into another empty page and may invalidate old data of the particular page due to a characteristic of a flash memory device. Further, the controller 130 may store map data of the new data into the FTL.

The processor 134 may be implemented with a microprocessor or a central processing unit (CPU). The memory system 110 may include one or more processors 134.

A management unit (not illustrated) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory such as a NAND flash memory, a program failure may occur during the write operation (i.e., during the program operation), due to characteristics of a NAND logic function. During the bad block management, the data of the program-failed memory block or the bad memory block may be programmed into a new memory block. Also, the bad blocks due to program failure seriously deteriorate the utilization efficiency of the memory device 150 having a 3D stack structure and the reliability of the memory system 100, and thus reliable bad block management is needed.

Figure 2:
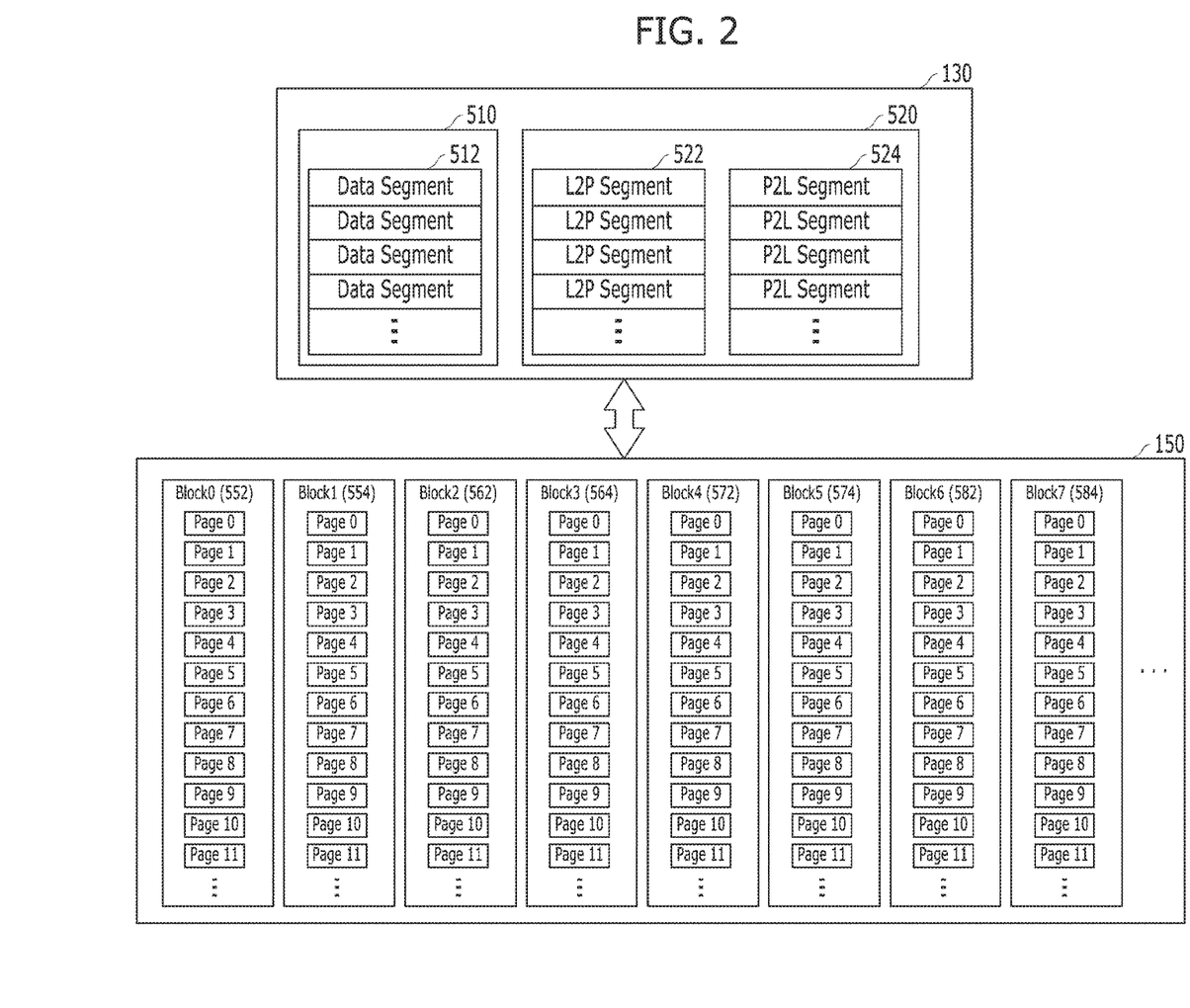
FIGS. 2 to 4 illustrate examples of data processing operations in a data processing system in accordance with an embodiment.
Figure 3:
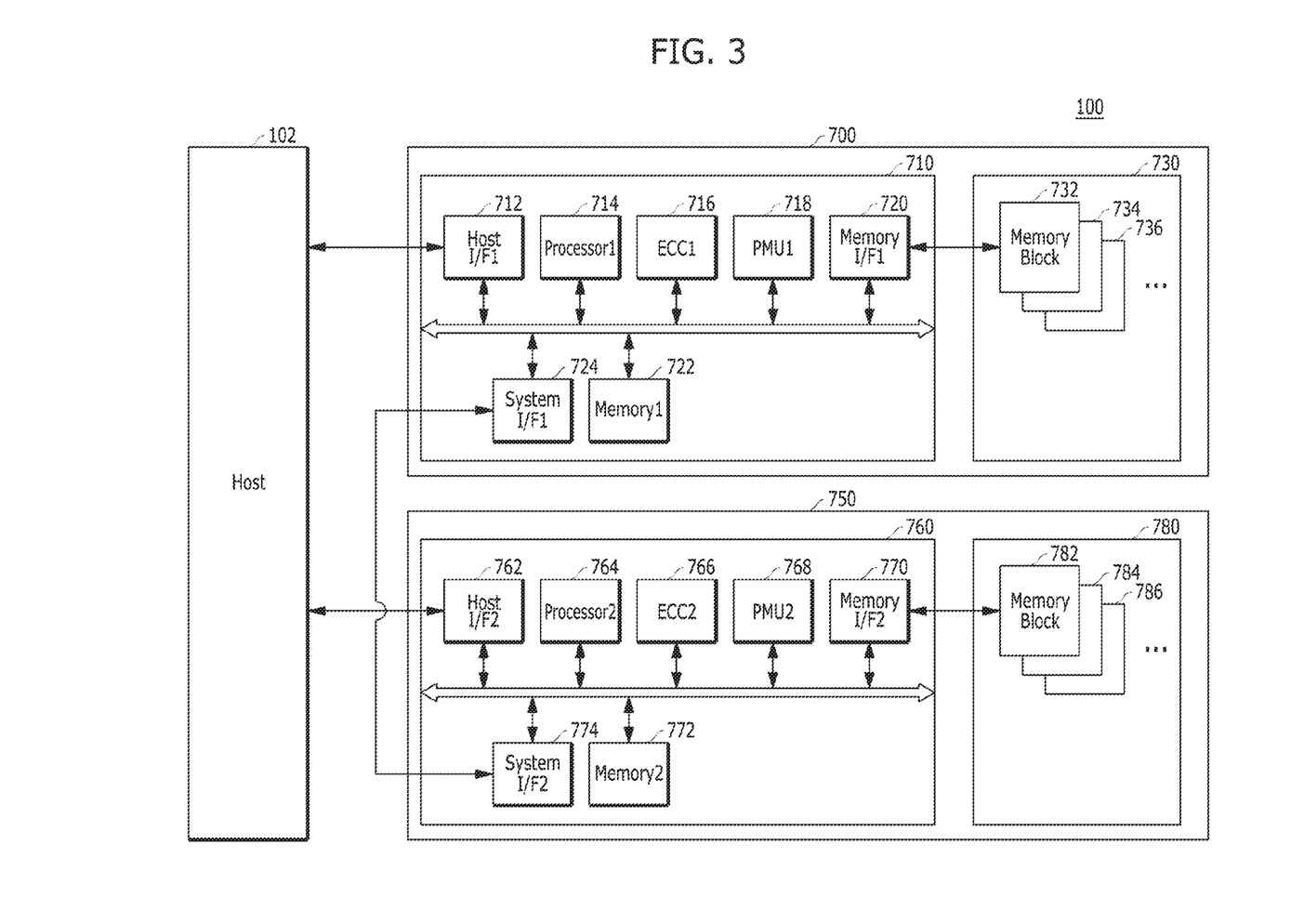
Figure 4:
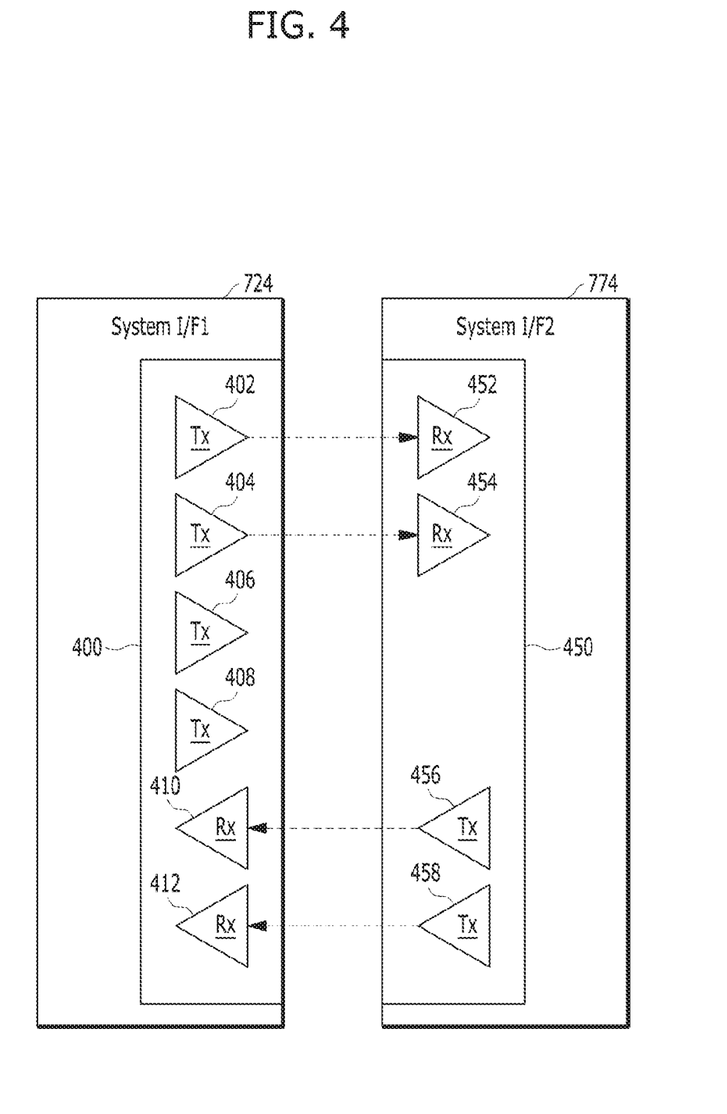

FIGS. 2 to 4 illustrate examples of data processing operations in a data processing system in accordance with an embodiment.

Referring to FIG. 2, the controller 130 may perform command operations corresponding to a plurality of commands received from the host 102. For example, the controller 130 may perform program operations corresponding to write commands received from the host 102. Herein, the controller 130 may program and store user data corresponding to the write commands in memory blocks 552, 554, 562, 564, 572, 574, 582 and 584 of the memory device 150, and may generate and update metadata for the user data when the program operations are performed on the memory blocks 552, 554, 562, 564, 572, 574, 582 and 584, and then store the generated and updated metadata in the memory blocks 552, 554, 562, 564, 572, 574, 582 and 584 of the memory device 150.

The controller 130 may generate and update information representing the user data stored in the pages included in the memory blocks 552, 554, 562, 564, 572, 574, 582 and 584 of the memory device 150, e.g., first map data and second map data. In other words, the controller 130 may generate and update logical segments of the first map data, which include L2P segments, and physical segments of the second map data, which include P2L segments, and store the generated and updated logical segments in the pages included in the memory blocks 552, 554, 562, 564, 572, 574, 582 and 584 of the memory device 150.

For example, the controller 130 may cache and buffer the user data corresponding to the write commands received from the host 102 in a first buffer 510 included in the memory 144 of the controller 130. In other words, the controller 130 may store data segments 512 of the user data in the first buffer 510, which is a data buffer/cache, and store the data segments 512 stored in the first buffer 510 in the pages included in the memory blocks 552, 554, 562, 564, 572, 574, 582 and 584 of the memory device 150. Since the data segments 512 of the user data corresponding to the write commands received from the host 102 are programmed and stored in the pages included in the memory blocks 552, 554, 562, 564, 572, 574, 582 and 584 of the memory device 150, the controller 130 may generate and update the first map data and the second map data, and store them in a second buffer 520 included in the memory 144 of the controller 130. In short, the controller 130 may store L2P segments 522 of the first map data and P2L segments 524 of the second map data for the user data in the second buffer 520, which is a map buffer/cache. Herein, as described above, the L2P segments 522 of the first map data and the P2L segments 524 of the second map data or a map list for the L2P segments 522 of the first map data and a map list for the P2L segments 524 of the second map data may be stored in the second buffer 520 in the memory 144 of the controller 130. Also, the controller 130 may store the L2P segments 522 of the first map data and the P2L segments 524 of the second map data that are stored in the second buffer 520 in the pages included in the memory blocks 552, 554, 562, 564, 572, 574, 582 and 584 of the memory device 150.

Also, the controller 130 may perform command operations corresponding to a plurality of commands received from the host 102. For example, the controller 130 may perform read operations corresponding to a plurality of read commands received from the host 102. Herein, the controller 130 may load and check out the map segments of the user data corresponding to the read commands, e.g., the L2P segments 522 of the first map data and the P2L segments 524 of the second map data, onto the second buffer 520, and then read the user data stored in the pages of the corresponding memory blocks among the memory blocks 552, 554, 562, 564, 572, 574, 582 and 584 of the memory device 150, store the data segments 512 of the read user data in the first buffer 510, and then transfer them to the host 102.

In addition, the controller 130 may perform command operations corresponding to a plurality of commands received from the host 102. For example, the controller 130 may perform erase operations corresponding to a plurality of erase commands received from the host 102. Herein, the controller 130 may detect memory blocks corresponding to the erase commands among the memory blocks 552, 554, 562, 564, 572, 574, 582 and 584 of the memory device 150, and perform the erase operations on the detected memory blocks.

When a background operation, for example, an operation of copying data or swapping data from the memory blocks included in the memory device 150, such as a garbage collection operation or a wear-leveling operation, is performed, the controller 130 may store the data segments 512 of the corresponding user data in the first buffer 510, store the map segments 522 and 524 of the map data corresponding to the user data in the second buffer 520, and perform the garbage collection operation or the wear-leveling operation.

In accordance with an embodiment of the present disclosure, the data processing system 100 may include one or more memory systems 110 that include the controller 130 and the memory device 150. In other words, the data processing system 100 may include the host 102 and one memory system 110 or a plurality of memory systems 110. Particularly, in the data processing system 100 including a plurality of memory systems 110, the memory systems 110 may perform command operations corresponding to a plurality of commands received from the host 102. When the memory systems 110 perform not only the command operations but also background operations, data may be transmitted/received between and stored in the memory systems 110. For example, when the command operations and background operations are performed in the memory systems 110, the controller 130 included in any of the memory systems 110 may transmit/receive data corresponding to the command operations and background operations with another memory system 110 to store the data in these two memory systems 110, and process the data corresponding to the command operations and background operations in each of these two memory systems 110.

Referring to FIG. 3, as described above, the data processing system 100 may include the host 102 and a plurality of memory systems, each having the controller (130 of FIG. 1 and FIG. 2) and the memory device (150 of FIG. 1 and FIG. 2). For example, the data processing system 100 may include a first memory system 700 and a second memory system 750. Herein, although for the sake of convenience in description it is described that the data processing system 100 may include two memory systems 700 and 750 as an example in an embodiment of the present disclosure, the inventive concepts may also be applied to a case where the data processing system 100 includes two or more memory systems 110 illustrated in FIG. 1.

The first memory system 700 may include a first controller 710 and a first memory device 730, and the second memory system 750 may include a second controller 760 and a second memory device 780. The first and second controllers 710 and 760 may include host interface (host I/F1 and host I/F2) units 712 and 762, processors (processor1 and processor2) 714 and 764, error correction code (ECC1 and ECC2) units 716 and 766, Power Management Units (PMU1 and PMU2) 718 and 768, memory interface (memory I/F1 and memory I/F2) units 720 and 770, memories (memory1 and memory2) 722 and 772, and system interface (system I/F1 and system I/F2) modules 724 and 774, respectively. The first memory device 730 may include a plurality of memory blocks 732, 734, and 736, and the second memory device 780 may include a plurality of memory blocks 782, 784, and 786.

The system interface (system I/F1 and system I/F2) modules 724 and 774 may process commands and transmission/reception of data between the first and second memory systems 700 and 750 included in the data processing system 100. The system interface (system I/F1 and system I/F2) modules 724 and 774 may be embodied through one or more of various interface protocols for communications between the first and second memory systems 700 and 750. For example, the system interface (system I/F1 and system I/F2)

modules 724 and 774 may be embodied through an universal flash storage (UFS) interface, for example, MIPI M-PHY (M-Physical Layer) and MIPI UniPro (Unified Protocol) in a mobile industry processor interface (MIPI), or through various card protocols, for example, USB flash drives (UFDs), MMC, SD, mini-SD, and micro-SD. Also, the system interface (system I/F1 and system I/F2) modules 724 and 774 may be embodied to allow the first and second memory systems 700 and 750 to communicate with each other through link layer switching, for example, Layer 3 (L3) switching at the UniPro. The system interface (system I/F1 and system I/F2) modules 724 and 774 may exist inside of the first and second controllers 710 and 760 included in the first and second memory systems 700 and 750, respectively, as shown in FIG. 3, or may exist outside of the first and second controllers 710 and 760, respectively. The system interface (system I/F1 and system I/F2) modules 724 and 774 may process commands and transmission/reception of data between the first and second controllers 710 and 760 through a device interface.

In other words, the first memory system 700 may be coupled to the second memory system 750 through a system interface module 724, and exchange signals and data with the second memory system 750 through the system interface module 724. The system interface module (system I/F1) 724, as described with reference to FIG. 4, may include a physical layer 400. The physical layer 400 may include physical components for exchanging data with the second memory system 750, for example, transmission terminals Tx 402, 404, 406 and 408 and reception terminals Rx 410 and 412 for exchanging data with other memory systems as well as the second memory system 750. The physical layer 400 may include a plurality of transmission terminals 406 and 408 to increase bandwidth for transmitting data to the memory systems. In an embodiment, the processor (processor1) 714 of the first memory system 700 may drive the system interface module (system I/F1) 724 of the first memory system 700 and provide an output (e.g., commands and/or data) of the system interface module (system I/F1) 724 to the system interface module (system I/F2) 774 of the second memory system 750 corresponding to the driving of the system interface module (system I/F1) 724.

The second memory system 750 may be coupled to the first memory system 700 through a system interface module 774, and exchange signals and data with the first memory system 700 through the system interface module 774. The system interface module (system I/F2) 774, as described with reference to FIG. 4, may include a physical layer 450. The physical layer 450 may include physical components for exchanging data with the first memory system 700, for example, transmission terminals Tx 456 and 458 and reception terminals Rx 452 and 454 for exchanging data with the first memory system 700. The physical layer 450 may further include a plurality of additional transmission terminals (not illustrated) to increase bandwidth for transmitting data to the memory systems. In an embodiment, the processor (processor2) 764 of the second memory system 750 may drive the system interface module (system I/F2) 774 of the second memory system 750 and provide an output (e.g., commands and/or data) of the system interface module (system I/F2) 774 to the system interface module (system I/F1) 724 of the first memory system 700 corresponding to the driving of the system interface module (system I/F2) 774.

FIG. 4 schematically illustrates the system interface modules 724 and 774 for transmitting data between the memory systems in the data processing system in accordance with an embodiment. The system interface modules 724 and 774, as described above, may be included in the first and second memory systems 700 and 750, respectively, exist outside the first and second memory systems 700 and 750, or exist inside the host 102. Each of the system interface modules 724 and 774 may exist to couple the first and second memory systems 700 and 750 with each other. In other words, the first memory system 700 may be coupled to the second memory system 750 through the physical layer 400 of the system interface module 724, and the second memory system 750 may be coupled to the first memory system 700 through the physical layer 450 of the system interface module 774. That is, the system interface modules 724 and 774 may couple the first and second memory systems 700 and 750. Particularly, the system interface modules 724 and 774 may form a plurality of channels or a plurality of lanes for exchanging signals and data between the first and second memory systems 700 and 750. The channels or the lanes may be dedicated channels for exchanging signals and data between the memory systems 700 and 750.

The physical layer 400 may include a plurality of transmission terminals and a plurality of reception terminals. The number of transmission terminals and reception terminals included in the physical layer 400 may be changed in various types or categories of the first memory system 700. The physical layer 450 may include a plurality of transmission terminals and a plurality of reception terminals. The number of transmission terminals and reception terminals included in the physical layer 450 may be changed in various types or categories of the second memory system 750. When the first memory system 700 and the second memory system 750 are systems of different types or different categories, the number of transmission terminals and reception terminals included in the physical layer 400 may be different from the number of transmission terminals and reception terminals included in the physical layer 450. The transmission terminal and the reception terminal coupled to each other in the physical layers 400 and 450 may form a single channel or lane. Any one of the transmission terminals may transmit signals and data to the reception terminal coupled thereto, and any one of the reception terminals may receive signals and data from the transmission terminal coupled thereto. The transmission terminal which is not coupled to the reception terminal and the reception terminal which is not coupled to the transmission terminal may not operate or be used.

In the data processing system 100, any memory system performing control and management functions for a plurality of memory systems, for example, a master memory system may receive commands for other memory systems as well as the master memory system from the host 102, and then transmit/receive the commands received from the host 102 and data corresponding to the commands to/from other memory systems. In the data processing system 100 in accordance with an embodiment of the present disclosure, a first memory system among the memory systems may be determined as the master memory system based on system information for the memory systems or may be determined as the master memory system through contention between the memory systems, and then the other memory systems may be determined as slave memory systems.

For example, the data processing system 100 may determine the master memory system among the memory systems based on the system information for the memory systems, that is, capability for command operations in each of the memory systems or the controller 130 and the memory device 150 included in each of the memory systems such as performance capability, process capability, process speed, process latency, etc. for the command operations, and reliability. Besides, the data processing system 100 may determine the master memory system among the memory systems through contention between the memory systems. For example, the master memory system may be determined through contention according to the coupling rank between the host 102 and each of the memory systems. The first memory system having the highest coupling state with the host 102, according to a coupling state between the host 102 and the memory systems, or the highest coupling rank, according to a coupling order to the host 102, may be determined as the master memory system.

In the data processing system 100, the memory systems may be divided into a primary memory system, a secondary memory system, a tertiary memory system, a quaternary memory system, etc. through contention between the memory systems or system information for the memory systems. After the primary memory system is determined as the master memory system, the master memory system may be dynamically changed to, for example, the secondary memory system or the tertiary memory system through contention between the memory systems or the system information for the memory systems. At this time, the primary memory system may be changed to a slave memory system.

The master memory system among the memory systems may receive a plurality of commands for a plurality of slave memory systems as well as a plurality of commands for the master memory system from the host 102, and control and manage command operations corresponding to the commands to be performed in the slave memory systems as well as the master memory system. The master memory system may check any slave memory system where each of the command operations is to be performed among the slave memory systems, and then control and manage to transmit/receive each of the respective commands and data with the slave memory systems. The master memory system may check background operations to be performed in the slave memory systems, and then control and manage the transmission/reception of data when the background operations are performed in the memory systems. Hereinafter, for the sake of convenience in description, it is described in detail as an example that the first memory system 700 and the second memory system 750 included in the data processing system 100 may be the master memory system and the slave memory system, respectively.

In other words, through the system information for the first and second memory systems 700 and 750 and contention therebetween the first memory system 700 may be the master memory system and the second memory system 750 may be the slave memory system. As described above, the designation of the first memory system 700 as the master memory system and the designation of the second memory system 750 as the slave memory system may be dynamically changed through the system information for the memory systems 700 and 750 and contention therebetween. In short, the second memory system 750 may be changed to the master memory system, and the first memory system 700 may be changed to the slave memory system.

The first controller 710 of the first memory system 700 may check the system information for the second memory system 750 (i.e., the second memory device 780 and the second controller 760 of the second memory system 750) as well as the system information for the first memory system 700 (i.e., the first memory device 730 and the first controller 710 of the first memory system 700). The first controller 710 of the first memory system 700 may receive the system information for the second memory system 750 from the second controller 760 of the second memory system 750 through the system interface modules 724 and 774 or from the host 102 through the host interface modules 712 and 762. At this time, the second controller 760 of the second memory system 750 may provide the system information for the second memory system 750 to the host 102, and the host 102 may provide the system information for the second memory system 750 to the first controller 710 of the first memory system 700.

When the first controller 710 of the first memory system 700 receives a plurality of commands from the host 102, the first controller 710 may check the commands, particularly, command operations corresponding to the commands and memory systems where the command operations are to be performed. For example, when the first controller 710 receives a plurality of write commands, read commands, or erase commands from the host 102, the first controller 710 may check memory systems where program operations corresponding to the write commands, read operations corresponding to the read commands, or erase operations corresponding to the erase commands are to be performed, and then, as described above, control and manage to perform the program operations, the read operations, or the erase operations in each of the memory systems.

Each of the first and second memory systems 700 and 750 or each of the controllers 710 and 760 of the first and second memory systems 700 and 750 may include a routing unit. Particularly, a master memory system or a controller of the master memory system may check each of the memory systems where command operations corresponding to commands received from the host 102 are to be performed through the routing unit, and then transmit the commands to the corresponding memory systems. In other words, the first controller 710 may transmit the commands received from the host 102 to the controllers of the memory systems where the command operations corresponding to the commands are to be performed. The first controller 710 may check the memory systems where the command operations corresponding to the commands are to be performed using an identifier included in the commands received from the host 102, for example, a command initiator ID, and transmit the commands to the checked memory systems. The first controller 710 may manage the commands and the memory systems to which the commands are transmitted based on a mapping table.

More specifically, when the first controller 710 receives a plurality of write commands from the host 102, for example, a first write command, a second write command, and a third write command, the first controller 710 may check the first memory system 700 where a first program operation corresponding to the first write command is to be performed, the second memory system 750 where a second program operation corresponding to the second write command is to be performed, and the first memory system 700 where a third program operation corresponding to the third write command is to be performed. Also, the first controller 710 may then perform the first program operation and the third program operation in the first memory system 700 and may transmit the second write command to the second controller 760 of the second memory system 750 through the system interface modules 724 and 774 so that the second program operation is performed in the second memory system 750.

The second controller 760 may receive the second write command from the host 102 through the first controller 710, and perform the second program operation corresponding to the second write command in the second memory system

750. Subsequently, the second controller 760 may transmit a performance result of the second program operation to the first controller 710 through the system interface modules 724 and 774, and the first controller 710 may provide the performance result of the second program operation received from the second controller 760 to the host 102. Also, in an embodiment, the second controller 760 may transmit and provide the performance result of the second program operation directly to the host 102.

During performance of the first program operation in the first memory system 700, when the size of first user data corresponding to the performance of the first program operation or the size of first meta data corresponding to the performance of the first program operation exceeds the size of the memory 722 included in the first controller 710 (e.g., the size of first and second buffers 510 and 520 included in the memory 722), the first controller 710 may store some segments among data segments included in the first user data and meta segments included in the first meta data in the first and second buffers 510 and 520 included in the memory 722 and store the other segments in the first and second buffers 510 and 520 included in the memory 772 of the second controller 760 of the second memory system 750. In other words, during the first program operation performed in the first memory system 700, the first controller 710 may cache and buffer the user data and the meta data corresponding to the first program operation in the memory 772 included in the second controller 760 of the second memory system 750 as well as the memory 722 included in the first controller 710 of the first memory system 700 so as to perform the first program operation in the first memory system 700. The first controller 710 may provide a performance result of the first program operation to the host 102.

As the first program operation is performed in the first memory system 700, the first controller 710 may control and manage the third program operation to be performed in the second memory system 750 when the first memory system 700 is in a busy state (e.g., a channel state of the first controller 710 and the first memory device 730 is in the busy state) or when an operation or performance of the first memory system 700 is in an inadequate state (e.g., an operation clock, a power level, a current/voltage level, operation timing, and a temperature level of the first memory system 700 are lower than a threshold level). The first controller 710 may transmit the third write command to the second controller 760 of the second memory system 750, through the system interface modules 724 and 774, so that a temporary program operation for the third program operation may be performed in the second memory system 750.

The second controller 760 may perform the third program operation, corresponding to the third write command received from the first controller 710, in the second memory system 750 and transmit a performance result of the third program operation to the first controller 710 through the system interface modules 724 and 774. The first controller 710 may check third meta data for third user data corresponding to the third write command in the second memory system 750, based on the performance result of the third program operation received from the second controller 760, and store and manage the third meta data in the memory 722 or the first memory device 730.

When the first memory system 700 is in an idle state or a ready state (e.g., the channel state of the first controller 710 and the first memory device 730 is in the idle state or the ready state) or when the operation or performance of the first memory system 700 is in a normal state (e.g., the operation clock, the power level, the current/voltage level, the operation timing, and the temperature level of the first memory system 700 are normal within the threshold level), the first controller 710 may check the third meta data stored in the memory 722 or the first memory device 730 and then copy and rollback the third user data programmed in the second memory system 750 into the first memory system 700. The first controller 710 may provide the performance result of the third program operation to the host 102.

Although it is described as an example in an embodiment of the present disclosure that a plurality of write commands among a plurality of commands are received from the host 102 (e.g., a plurality of program operations among a plurality of command operations to be performed in the memory systems 700 and 750), the inventive concepts may be also applied to cases where a plurality of read commands and a plurality of erase commands are received from the host 102 (e.g., a plurality of read operations and a plurality of erase operations to be performed in the memory systems 700 and 750).

In addition, when background operations (e.g., copy operations or swap operations) are performed in the memory systems 700 and 750, particularly, when the background operations are performed in the first memory system 700, the first controller 710 of the first memory system 700 may store user data or meta data corresponding to the background operations in the memory 772 included in the second controller 760 of the second memory system 750 or the second memory device 780 in accordance with the following cases. When the size of the user data or meta data corresponding to the background operations performed in the first memory system 700 exceeds the size of the memory 722 included in the first controller 710 (e.g., the size of the first buffer 510 or second buffer 520 included in the memory 722) or when the memory 722 included in the first controller 710 or the first memory device 730 is in an inadequate state or a dirty state, the first controller 710 of the first memory system 700 may store the user data or the meta data, corresponding to the background operations, in the memory 772 included in the second controller 760 of the second memory system 750 or the second memory device 780. That is, the first controller 710 of the first memory system 700 may use the memory 772 included in the second controller 760 of the second memory system 750 or the second memory device 780 to perform the background operations in the first memory system 700.

When background operations (e.g., copy operations or swap operations) are performed in the memory systems 700 and 750, particularly, when the background operations are performed in the second memory system 750, the second controller 760 of the second memory system 750 may store user data or meta data corresponding to the background operations in the memory 722 included in the first controller 710 of the first memory system 700 or the first memory device 730 in accordance with the following cases. When the size of the user data or meta data corresponding to the background operations performed in the second memory system 750 exceeds the size of the memory 772 included in the second controller 760 (e.g., the size of the first buffer 510 or second buffer 520 included in the memory 772) or when the memory 772 included in the second controller 760 or the second memory device 780 is in an inadequate state or a dirty state, the second controller 760 of the second memory system 750 may store user data or meta data, corresponding to the background operations, in the memory 722 included in the first controller 710 of the first memory system 700 or the first memory device 730. That is, the second controller 760 of the second memory system 750 may use the memory 722 included in the first controller 710 of the first memory system 700 or the first memory device 730 to perform the background operations in the second memory system 750.

In the data processing system in accordance with an embodiment of the present disclosure, a controller included in a master memory system among a plurality of memory systems may check memory systems where command operations corresponding to a plurality of commands received from a host are to be performed, and then transmit/receive the commands and data corresponding to the commands with the corresponding memory systems, thereby normally performing the corresponding command operations in the plurality of memory systems. Particularly, as a memory of a controller or a memory device included in another memory system is used to perform the command operations in each of the memory systems, a memory or a memory device in each of the memory systems may be used more extensively, thereby further improving the utilization efficiency of the memory systems. Also, depending on the state of the memory or memory device included in each of the memory systems or the state of each of the memory systems (e.g., a channel state, an operation state, or a performance state), the memory of the controller or the memory device included in another memory system may be used to perform operations in the memory systems, thereby further improving operational performance and reliability of the memory systems. Hereinafter, an operation of processing data in the data processing system is described in detail with reference to FIG. 5.

Figure 5:
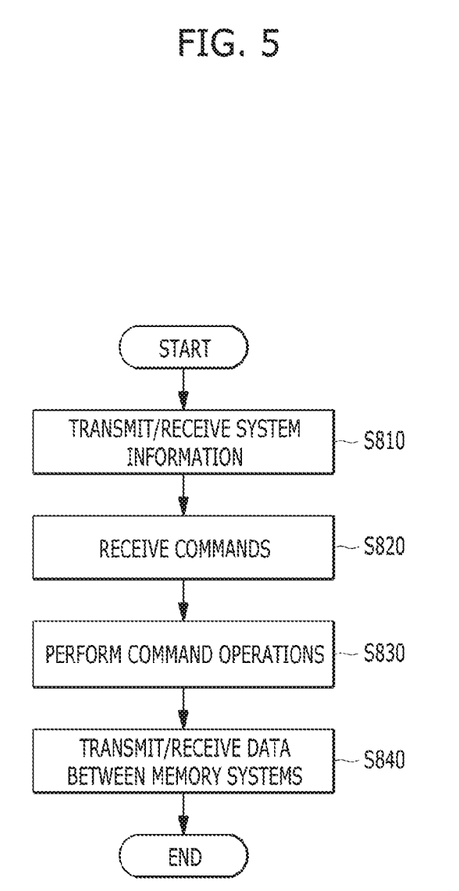
FIG. 5 is a flowchart describing an operation process of processing data in a data processing system in accordance with an embodiment.

FIG. 5 is a flowchart describing an operation process of processing data in the data processing system in accordance with an embodiment.

Referring to FIG. 5, in step S810, the data processing system 100 may transmit/receive system information for each of the memory systems. Particularly, the controller included in the master memory system among the memory systems included in the data processing system 100 may check system information for the other memory systems, i.e., the slave memory systems, as well as system information for the master memory system.

In step S820, the data processing system 100 may receive a plurality of commands for the memory systems from the host 102. In step S830, the data processing system 100 may check each of the memory systems where command operations corresponding to the commands are to be performed, transmit respective commands to each of the respective memory systems through a plurality of dedicated channels, and perform the corresponding command operations in each of the memory systems. In an embodiment, the performing of the corresponding command operations may include performing a command operation corresponding to the master memory system (e.g., first memory system 700 of FIG. 3) in at least one of the other memory systems, i.e., the slave or remaining memory systems (e.g., second memory system 750 of FIG. 3).

In step S840, the data processing system 100 may transmit/receive data between the memory systems depending on the state of the memory or memory device included in each of the memory systems or the state of each of the memory systems, e.g., a channel state, an operation state, or a performance state. The data processing system 100 may use the memory of the controller or the memory device included in another memory system to perform the command operations in the memory systems.

Herein, since the master memory system and slave memory system among a plurality memory systems included in the data processing system 100 and the data processing operation in the memory systems, particularly, the data processing operation between the master memory system and the slave memory system are described above in detail with reference to FIGS. 2 to 4, further descriptions thereon will be omitted. Hereinafter, a data processing system and electronic devices to which the memory system 110 including the memory device 150 and the controller 130, described above with reference to FIGS. 1 to 5 in accordance with embodiments of the present disclosure, are applied will be described in detail with reference to FIGS. 6 to 10.

FIGS. 6 to 9 are diagrams schematically illustrating other examples of the data processing system including the memory system in accordance with embodiments of the present disclosure. FIGS. 6 to 9 schematically illustrate UFS (Universal Flash Storage) systems to which the memory system in accordance with various embodiments is applied.

Referring to FIGS. 6 to 9, the UFS systems 6500, 6600, 6700, and 6800 may include hosts 6510, 6610, 6710 and 6810; UFS devices 6520, 6620, 6720, and 6820; and UFS cards 6530, 6630, 6730, and 6830, respectively. The hosts 6510, 6610, 6710, and 6810 may serve as application processors of wired/wireless electronic devices or particularly mobile electronic devices; the UFS devices 6520, 6620, 6720, and 6820 may serve as embedded UFS devices; and the UFS cards 6530, 6630, 6730, and 6830 may serve as external embedded UFS devices or removable UFS cards.

The hosts 6510, 6610, 6710, and 6810; the UFS devices 6520, 6620, 6720, and 6820; and the UFS cards 6530, 6630, 6730, and 6830 in the respective UFS systems 6500, 6600, 6700, and 6800 may communicate with external devices, for example, wired/wireless electronic devices or particularly mobile electronic devices through UFS protocols. The UFS devices 6520, 6620, 6720, and 6820 and the UFS cards 6530, 6630, 6730, and 6830 may be embodied by the memory system 110 illustrated in FIG. 1.

Furthermore, in the UFS systems 6500, 6600, 6700, and 6800, the hosts 6510, 6610, 6710 and 6810; the UFS devices 6520, 6620, 6720, and 6820; and the UFS cards 6530, 6630, 6730, and 6830 may communicate with each other through an UFS interface, for example, MIPI M-PHY (M-Physical Layer) and MIPI UniPro (Unified Protocol) in a MIPI (Mobile Industry Processor Interface). Furthermore, the UFS devices 6520, 6620, 6720, and 6820 and the UFS cards 6530, 6630, 6730, and 6830 may communicate with each other through various protocols other than the UFS protocol, for example, UFDs, MMC, SD, mini-SD, and micro-SD.

Figure 6:
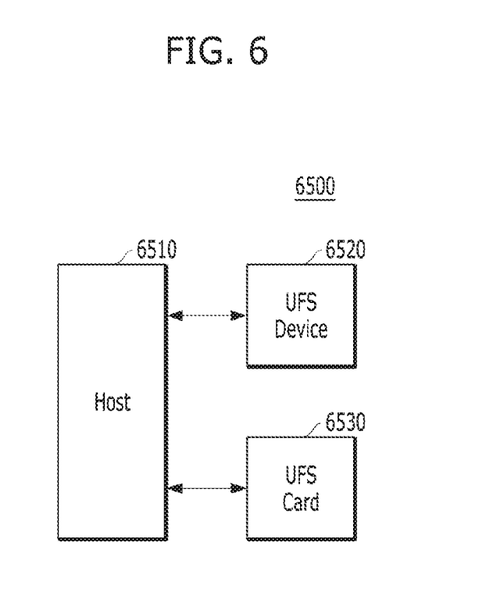
FIGS. 6 to 10 are diagrams schematically illustrating application examples of a data processing system including a memory system in accordance with various embodiments.

In the UFS system 6500 illustrated in FIG. 6, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 7:
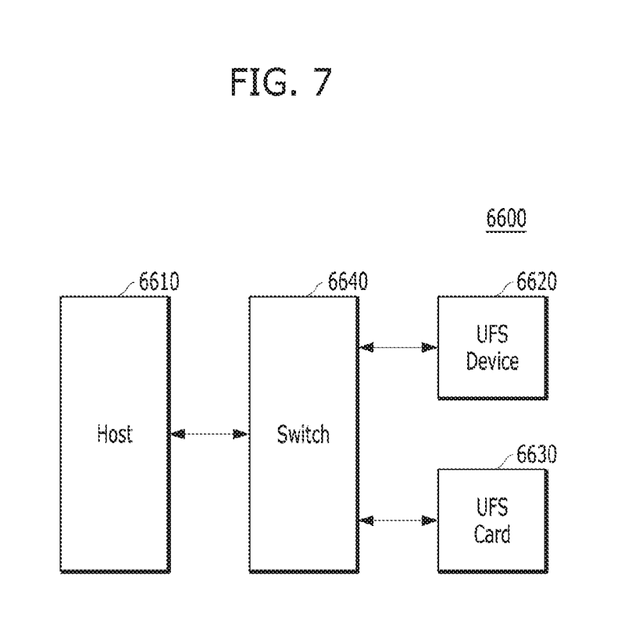

In the UFS system 6600 illustrated in FIG. 7, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 8:
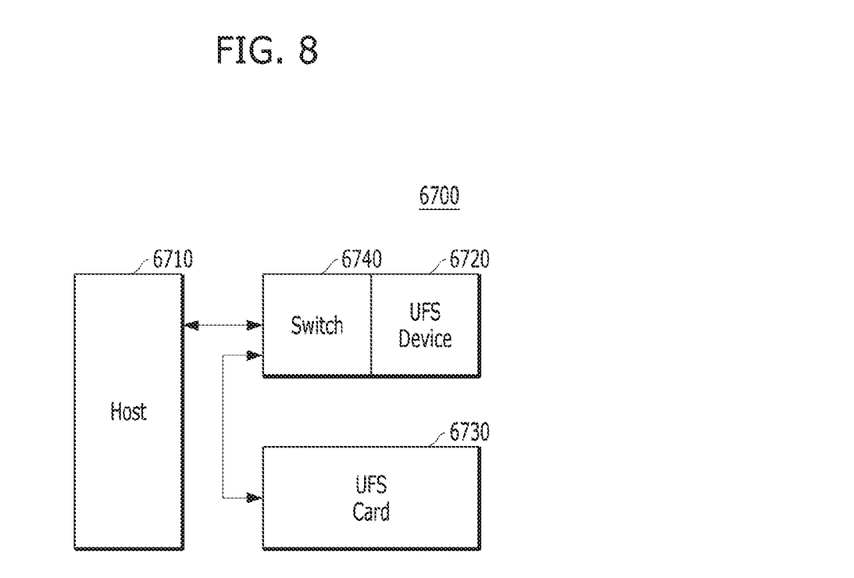

In the UFS system 6700 illustrated in FIG. 8, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 9:
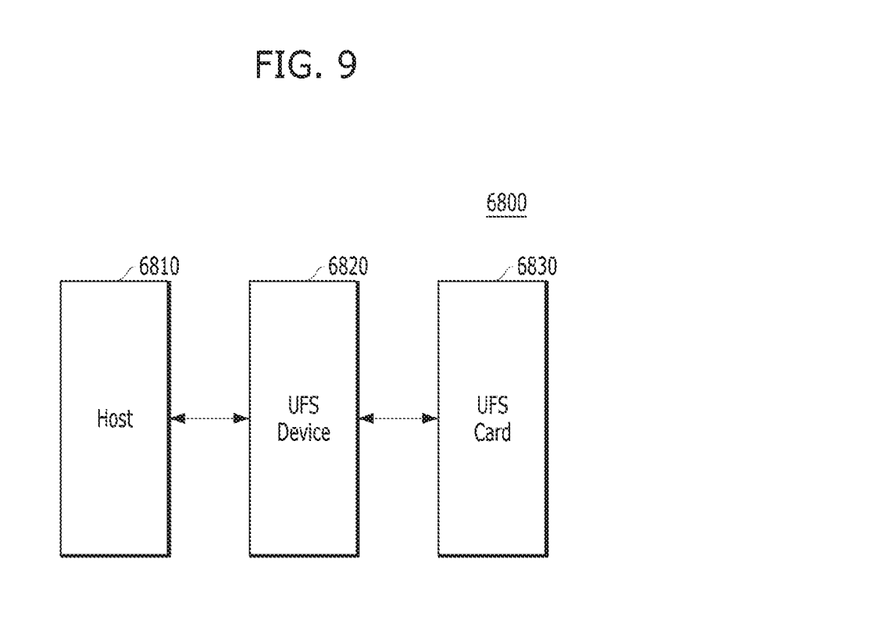

In the UFS system 6800 illustrated in FIG. 9, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 10:
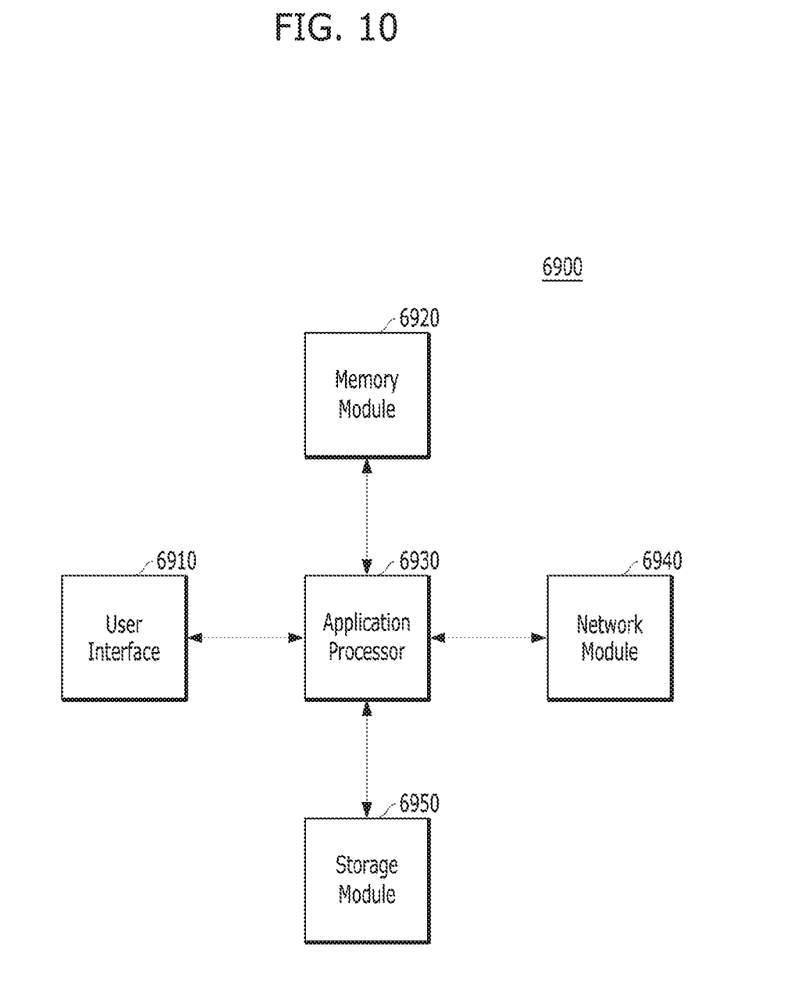

FIG. 10 is a diagram schematically illustrating another example of the data processing system including the memory system in accordance with embodiments of the present disclosure. FIG. 10 is a diagram schematically illustrating a user system to which the memory system in accordance with various embodiments is applied.

Referring to FIG. 10, the user system 6900 may include an application processor 6930, a memory module 6920, a network module 6940, a storage module 6950, and a user interface 6910.

More specifically, the application processor 6930 may drive components included in the user system 6900 (e.g., an operating system OS) and include controllers, interfaces, and a graphic engine which control the components included in the user system 6900. The application processor 6930 may be provided as a System-on-Chip (SoC).

The memory module 6920 may be used as a main memory, work memory, buffer memory, or cache memory of the user system 6900. The memory module 6920 may include a volatile RAM [e.g., DRAM, synchronous DRAM (SDRAM), double data rate SDRAM (DDR SDRAM), DDR2 SDRAM, DDR3 SDRAM, low power DDR SDRAM (LPDDR SDRAM), LPDDR3 SDRAM, or LPDDR3 SDRAM] or a nonvolatile RAM [e.g., PRAM, ReRAM, MRAM, or FRAM]. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), etc., thereby enabling communication with wired/wireless electronic devices or particularly mobile electronic devices. Therefore, the memory system and the data processing system, in accordance with embodiments of the present disclosure, may be applied to wired/wireless electronic devices. In an embodiment, the network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device [e.g., a phase-change RAM (PRAM), a magnetic RAM (MRAM), a resistive RAM (ReRAM), a NAND flash, NOR flash, and a 3D NAND flash], and provided as a removable storage medium such as a memory card or external drive of the user system 6900. The storage module 6950 may correspond to the memory system 110 described with reference to FIG. 1. Furthermore, the storage module 6950 may be embodied as an UFS as described above with reference to FIGS. 6 to 9.

The user interface 6910 may include interfaces for inputting data or commands to the application processor 6930 or outputting data to an external device. For example, the user interface 6910 may include user input interfaces (e.g., a keyboard, a keypad, a button, a touch panel, a touch screen, a touch pad, a touch ball, a camera, a microphone, a gyroscope sensor, a vibration sensor, and a piezoelectric element) and user output interfaces (e.g., a liquid crystal display (LCD), an organic light emitting diode (OLED) display device, an active matrix OLED (AMOLED) display device, an LED, a speaker, and a motor).

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present disclosure has been described with respect to specific embodiments, it will be apparent to those skilled in the art that various changes and modifications may be made without departing from the spirit and scope of the disclosure as defined in the following claims.

What is claimed is:

1. A data processing system, comprising:
a plurality of memory systems configured to be coupled to each other by a plurality of dedicated channels; and
a host configured to be coupled to the plurality of memory systems and provide commands for the memory systems,
wherein a master memory system receives the commands from the host, transmits a first command corresponding to a slave memory system among the commands through the plurality of dedicated channels, and the slave memory system performs a first command operation according to the first command,
wherein the master memory system checks meta data of first data corresponding to the first command operation through a performance result of the first command operation performed in the slave memory system, and subsequently copies and rollbacks the first data from the slave memory system into the master memory system.

2. The data processing system of claim 1, further comprising:
interface modules formed between the memory systems, wherein the dedicated channels couple the interface modules of each of the memory systems.

3. The data processing system of claim 2, wherein a first interface module among the interface modules is included in the master memory system, and a second interface module among the interface modules is included in the slave memory system among the memory systems.

4. The data processing system of claim 3, wherein the master memory system transmits the first command to the slave memory system through a first dedicated channel among the dedicated channels that the first interface module and the second interface module form.

5. The data processing system of claim 3, wherein the master memory system transmits the first command to the slave memory system through a first dedicated channel formed by the first interface module and the second interface module when the master memory system is in a busy state based on performance of a second command operation corresponding to the master memory system.

6. The data processing system of claim 5, wherein the slave memory system performs the first command operation in the slave memory system based on the first command and transmits a performance result of the first command operation to the master memory system through the first dedicated channel.

7. The data processing system of claim 6, wherein the slave memory system stores the first data corresponding to the first command operation in at least one of a second memory device of the slave memory system and a second memory of a second controller of the slave memory system.

8. The data processing system of claim 1, wherein the master memory system stores second data, corresponding to the second command operation, and the first data in at least one of a first memory device of the master memory system and a first memory of a first controller of the master memory system.

9. The data processing system of claim 6, wherein the master memory system stores data stored in a first memory device of the master memory system in at least one of a second memory device of the slave memory system and a second memory of a second controller of the slave memory system through the first dedicated channel, and
the second controller stores data stored in the second memory device in at least one of the first memory device of the master memory system and a first memory of a first controller of the master memory system through the first dedicated channel.

10. The data processing system of claim 1, wherein the master memory system is dynamically determined corresponding to at least one of capability and reliability for command operations, a state of being coupled to the host, and an order of being coupled to the host among the memory systems.

11. An operating method of a data processing system, comprising:
receiving a plurality of commands for a plurality of memory systems from a host;
checking each of the memory systems where a plurality of command operations corresponding to the commands are to be performed;
transmitting respective commands among the commands to each of the respective memory systems through a plurality of dedicated channels; and
performing the corresponding command operations in each of the memory systems,
wherein the performing of the corresponding command operations includes performing a first command operation corresponding to a master memory system among the memory systems in a slave memory system,
wherein checking meta data of first data corresponding to the first command operation through a performance result of the first command operation performed in the slave memory system and copying and rollbacking the first data from the slave memory system into the master memory system.

12. The operating method of claim 11, wherein the transmitting of the respective commands to each of the respective memory systems includes transmitting a first command corresponding to the first command operation to the slave memory system through a first dedicated channel among the plurality of dedicated channels coupling the master memory system and the slave memory system when the master memory system is in a busy state based on performance of a second command operation corresponding to the master memory system.

13. The operating method of claim 12, wherein the transmitting of the respective commands to each of the respective memory systems includes transmitting a third command corresponding to the slave memory system to the slave memory system through the first dedicated channel.

14. The operating method of claim 12, wherein the performing of the corresponding command operations includes:
performing the first command operation in the slave memory system based on the first command; and
transmitting a performance result of the first command operation to the master memory system through the first dedicated channel.

15. The operating method of claim 14, further comprising:
Storing the first data corresponding to the first command operation in at least one of a second memory device of the slave memory system and a second memory of a second controller of the slave memory system.

16. The operating method of claim 11, further comprising:
storing second data, corresponding to the second command operation, and the first data in at least one of a first memory device of the master memory system and a first memory of a first controller of the master memory system.

17. The operating method of claim 14, further comprising:
storing data stored in a first memory device of the master memory system in at least one of a second memory device of the slave memory system and a second memory of a second controller of the slave memory system through the first dedicated channel; and
storing data stored in the second memory device in at least one of a first memory device of the master memory system and a first memory of a first controller of the master memory system through the first dedicated channel.

18. A data processing system, comprising:
a host;
a master memory system including a first host interface and a first system interface;
a slave memory system including a second host interface and a second system interface; and
a dedicated channel coupling the first system interface and the second system interface,
wherein any one of the master memory system and the slave memory system performs an operation of the host based on a command of the host,
wherein the master memory system is dynamically determined corresponding to at least one of capability and reliability for command operations, a state of being coupled to the host, and an order of being coupled to the host among the memory systems.

19. A data processing system, comprising:
a plurality of memory systems configured to be coupled to each other by a plurality of dedicated channels; and
a host configured to be coupled to the plurality of memory systems and provide commands for the memory systems,
wherein a master memory system receives the commands from the host, transmits a first command corresponding to a slave memory system among the commands through the plurality of dedicated channels, and the slave memory system performs a first command operation according to the first command,
wherein the master memory system is dynamically determined corresponding to at least one of capability and reliability for command operations, a state of being coupled to the host, and an order of being coupled to the host among the memory systems.

* * * * *